(12) United States Patent
Han et al.

(10) Patent No.: US 7,111,186 B2
(45) Date of Patent: Sep. 19, 2006

(54) METHOD AND APPARATUS FOR STATIC PHASE OFFSET CORRECTION

(75) Inventors: Zhigang Han, Sunnyvale, CA (US); Cong Khieu, San Jose, CA (US); Kailashnath Nagarakanti, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 10/425,213

(22) Filed: Apr. 28, 2003

(65) Prior Publication Data

US 2004/0215993 A1    Oct. 28, 2004

(51) Int. Cl.
*G06F 1/12* (2006.01)

(52) U.S. Cl. ...................... 713/500; 713/400

(58) Field of Classification Search ................. 713/500
See application file for complete search history.

(56) References Cited

U.S. PATENT DOCUMENTS

| | | | | |
|---|---|---|---|---|
| 5,471,587 A | * | 11/1995 | Fernando | 710/307 |
| 5,701,447 A | * | 12/1997 | Hahn | 713/600 |
| 5,802,132 A | * | 9/1998 | Pathikonda et al. | 377/48 |
| 6,157,233 A | * | 12/2000 | Horigan et al. | 327/163 |
| 6,172,937 B1 | * | 1/2001 | Ilkbahar et al. | 365/233 |
| 6,182,237 B1 | * | 1/2001 | Bronson et al. | 713/503 |
| 6,640,310 B1 | * | 10/2003 | Jensen et al. | 713/500 |
| 6,943,610 B1 | * | 9/2005 | Saint-Laurent | 327/295 |
| 2002/0199124 A1 | | 12/2002 | Adkisson | 713/400 |

FOREIGN PATENT DOCUMENTS

EP    0 735 494 A1    10/1996

* cited by examiner

*Primary Examiner*—Chun Cao
(74) *Attorney, Agent, or Firm*—Gunnison, McKay & Hodgson, L.L.P.; Lisa A. Norris

(57) ABSTRACT

A CPU clock signal generated from a phase lock loop (PLL) circuit and a feedback signal of the PLL circuit are used in generating a JBUS clock signal. The CPU clock signal and the feedback signal include the same amount of static phase offset introduced by the PLL circuit. The CPU clock signal and the feedback signal are input to an alignment detection circuit and used in generating the JBUS clock signal. In one embodiment, the JBUS clock signal is generated in synchronization with the CPU clock signal and having the frequency of the feedback signal. The present invention reduces or eliminates misalignment of the leading edge of the JBUS signal with reference to a specific leading edge of the CPU clock signal due to the presence of static phase offset introduced by the PLL circuit.

14 Claims, 6 Drawing Sheets

US 7,111,186 B2

METHOD AND APPARATUS FOR STATIC PHASE OFFSET CORRECTION

BACKGROUND OF THE INVENTION

1. Field of the Invention

The present invention is directed to the field of microprocessors, and more particularly, to alignment of clock signals in microprocessors.

2. Description of Related Art

Conventionally, many of the digital circuits that make up a microprocessor are synchronously designed to transfer a digital signal in accordance with a clock signal and, thus, require precise timing to function properly. To manage the timing requirements throughout the microprocessor, the microprocessor is typically divided up into several clock domains.

When a digital signal travels across two clock domains, the clock signals used within the two clock domains should be synchronized so that the data signal will be received in a specific window of time in order for it to be utilized by a receiving component. Typically, this specific window of time is defined in terms of set up and hold times which define a period of time during which a data signal must be stable to be correctly received, e.g., sampled.

The synchronization of two clock signals that is particularly important in a microprocessor is the synchronization of the central processor unit (CPU) clock signal and the address/data bus clock signal, such as a JBUS clock signal, as these clock signals control the flow of information between the CPU and elements peripheral to the CPU.

FIG. 1 illustrates a block diagram of a prior art circuit 100 used for generating a JBUS clock signal 118 utilizing a system clock signal 110 and a CPU clock signal 114. In circuit 100, system clock signal 110 was generated at a fixed frequency and was input to a phase lock loop (PLL) circuit 112 to generate a CPU clock signal 114. Unfortunately, generation of CPU clock signal 114 using PLL circuit 112 typically resulted in some static phase offset being introduced into CPU clock signal 114 due to current leakage in PLL circuit 112 as well as other well known problems inherent to PLL circuit 112.

Static phase offset, also known as phase error, is typically a measure of the time difference between the averaged input reference clock signal and the averaged feedback input signal when a PLL circuit is locked and the input reference frequency is stable. In prior art circuit 100, static phase offset measured the time difference between the averaged leading edge of system clock signal 110 and the averaged leading edge of CPU clock signal 114.

Although PLL circuit 112 typically utilized a feedback signal in the generation of CPU clock signal 114 to maintain synchronization, some static phase offset still remained and resulted in delay of the leading edge of CPU clock signal 114 with reference to the leading edge of system clock signal 110. Consequently, CPU clock signal 114 and system clock signal 110 were typically not synchronized, e.g., the leading edges were not in alignment, when they were input to an alignment detection circuit 116 used in generating JBUS clock signal 118.

In alignment detection circuit 116, system clock signal 110 and CPU clock signal 114 were used in generating JBUS clock signal 118. However, due to the static phase offset introduced by PLL circuit 112 into CPU clock signal 114, the leading edge of JBUS clock signal 118 was frequently generated with an adjustment back one or more clock cycles from where it should, under ideal conditions, have been aligned with CPU clock signal 114. Consequently, synchronization, e.g., alignment of the leading edges, of JBUS clock signal 118 to CPU clock signal 114 often became uncontrollable.

FIG. 2 illustrates an example of a timing diagram 200 for prior art circuit 100 including system clock signal 110, CPU clock signal 114, and resulting JBUS clock signal 118. Referring now to FIGS. 1 and 2 together, assume JBUS clock signal 118 was to be generated at a two clock cycle delay from system clock 110 which had a frequency $f_{P4\_SYS}$ and was to be in alignment with the leading edge of CPU clock signal 114. When system clock signal 110 was input to PLL circuit 112, resulting CPU clock signal 114 was generated with a frequency $f_{P4\_CPU}$ and had a non-synchronous leading edge due to a static phase offset 202 introduced by PLL circuit 112.

When system clock signal 110 and CPU clock signal 114 were input to alignment detection circuit 116, JBUS clock signal 118 was generated with a frequency $f_{P4\_JBUS}$ that was equal to frequency $f_{P4\_SYS}$ of system clock 110. However, rather than the leading edge of JBUS clock signal 118 being synchronized with the leading edge of CPU clock signal 114 at a two clock cycle delay from system clock 110, for example, clock cycle 3 (indicator A), the leading edge of JBUS clock signal 118 was generated with a misalignment 204, for example, to clock cycle 4 (indicator B).

In earlier generations of microprocessors, the static phase offset of CPU clock signal 114 was not a significant problem in the generation of JBUS clock signal 118 due to slower clock speeds, smaller leakage current, and comparatively larger timing tolerances. However, as clock speeds increased and component sizes decreased, timing tolerances became smaller, for example, smaller set up and hold times, and the static phase offset introduced into CPU clock signal 114 became excessive, and a more pronounced problem in generation of JBUS clock signal 118. The misalignment of the leading edge of JBUS clock signal 118 often resulted in set-up and hold time failures with consequent data loss.

SUMMARY OF THE INVENTION

In order to reduce or eliminate the effect of static phase offset (from the CPU clock signal) in the generation of the JBUS clock signal and achieve the best margin for both setup and hold times, embodiments in accordance with present invention generate a JBUS clock signal utilizing a CPU clock signal and a feedback signal of a phase lock loop (PLL) circuit used in generating the CPU clock signal from a system clock signal. The feedback signal of the PLL circuit has the same frequency as the system clock signal, and the same static phase offset as the CPU clock signal.

With the present invention, excessive static phase offset does not affect the alignment of the JBUS clock signal because the same static phase offset is present in both the feedback signal and the CPU clock signal. Consequently, an alignment detection circuit used in generating the JBUS clock signal does not detect an alignment disparity between the feedback signal of the PLL circuit and the CPU clock signal due to static phase offset. Therefore, the alignment detection circuit does not misalign the leading edge of the JBUS clock signal due to the static phase offset.

In accordance with one embodiment, a method for generating a JBUS clock signal includes: inputting a central processor (CPU) clock signal to an alignment detection circuit, the CPU clock signal being generated from a phase lock loop (PLL) circuit utilizing a system clock signal having a frequency $f_{SYS}$, the CPU clock signal having a leading edge at a selected clock cycle and a frequency $f_{CPU}$; inputting a feedback signal from the PLL circuit to the alignment detection circuit, the feedback signal having a frequency $f_{FDBK}$ that is equal to the frequency $f_{SYS}$; and generating a JBUS clock signal by the alignment detection circuit, a leading edge of the JBUS clock signal being synchronized with the leading edge of the CPU clock signal and having a frequency $f_{JBUS}$ that is equal to the frequency $f_{FDBK}$.

In accordance with another embodiment, a method for generating a JBUS clock signal includes: inputting a system clock signal to a phase lock loop (PLL) circuit, the system clock signal having a frequency $f_{SYS}$; generating a CPU clock signal by the PLL circuit utilizing the system clock signal; generating a feedback signal by the PLL circuit; inputting the CPU clock signal generated by the PLL circuit to an alignment detection circuit, the CPU clock signal having a leading edge at a specified clock cycle and a frequency $f_{CPU}$; inputting the feedback signal generated by the PLL circuit to the alignment detection circuit, the feedback signal having a frequency $f_{FDBK}$ equal to the frequency $f_{SYS}$; and generating a JBUS clock signal by the alignment detection circuit, a leading edge of the JBUS clock signal being synchronized with the leading edge of the CPU clock signal and having a frequency $f_{JBUS}$ that is equal to the frequency $f_{FDBK}$.

In accordance with a further embodiment, a static phase offset corrected clock alignment circuit for generating a JBUS clock signal includes: a phase lock loop (PLL) circuit for receiving a system clock signal and for generating a CPU clock signal and a feedback signal; and an alignment detection circuit coupled to the PLL circuit, the alignment detection circuit for receiving input of the CPU clock signal and the feedback signal from the PLL circuit, and for generating a JBUS clock signal.

In accordance with a next embodiment, a static phase offset corrected clock alignment circuit for generating a JBUS clock signal includes: a phase lock loop (PLL) circuit including one or more circuit elements for generating a CPU clock signal and a feedback signal, the PLL circuit further including: an input for receiving a system clock signal, a first output for outputting the CPU clock signal, and a second output for outputting the feedback signal; and an alignment detection circuit coupled to the PLL circuit, the alignment detection circuit including one or more circuit elements for generating a JBUS clock signal, the alignment detection circuit further including: a first input coupled to the first output of the PLL circuit, the first input for receiving the CPU clock signal, a second input coupled to the second output of the PLL circuit, the second input for receiving the feedback signal, and an output for outputting the JBUS clock signal.

In accordance with yet a another embodiment, a computer system includes: a system clock for generating a system clock signal; a static phase offset corrected clock alignment circuit coupled to the system clock, the static phase offset corrected clock alignment circuit for receiving the system clock signal, the static phase offset corrected clock alignment circuit including: a phase lock loop (PLL) circuit coupled to the system clock, the PLL circuit for receiving the system clock signal and for generating a CPU clock signal and a feedback signal, and an alignment detection circuit coupled to the PLL circuit, the alignment detection circuit for receiving input of the CPU clock signal and the feedback signal from the PLL circuit, and for generating a JBUS clock signal; a central processor unit (CPU) coupled to the static phase offset corrected clock alignment circuit, the CPU for receiving input of the CPU clock signal from the static phase offset corrected clock alignment circuit; and a JBUS bus coupled to the static phase offset corrected clock alignment circuit, the JBUS bus for receiving input of the JBUS clock signal from the static phase offset corrected clock alignment circuit.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this specification, illustrate embodiments of the invention, and together with the description, serve to explain the principles of the invention. In the drawings, the same reference numbers are used to denote similar components in the various embodiments.

In the drawings.

DETAILED DESCRIPTION

The invention will now be described in reference to the accompanying drawings. The same reference numbers can be used throughout the drawings and the following description to refer to the same or like parts.

Figure 1:
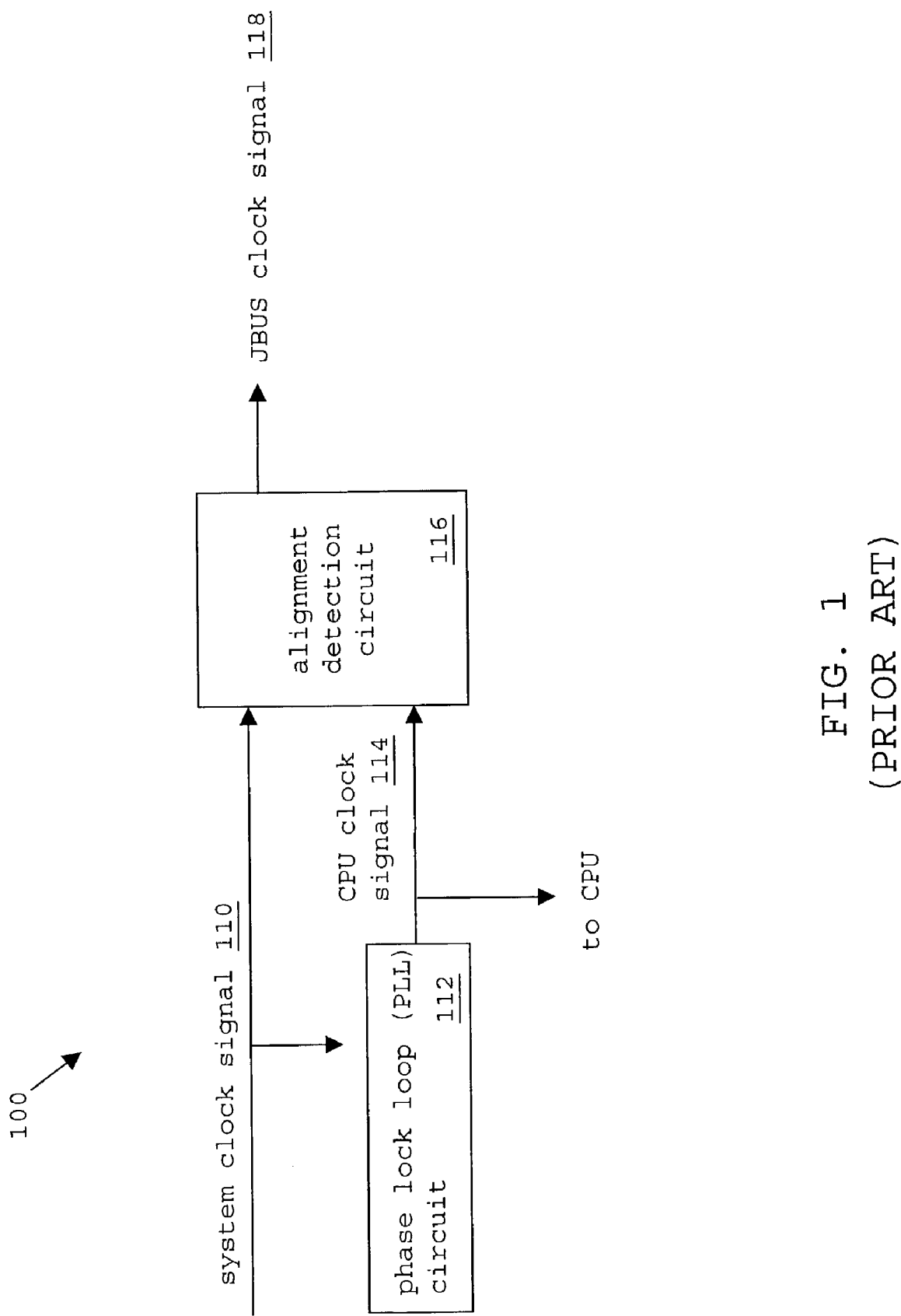
FIG. 1 illustrates a block diagram of a prior art circuit used for generating a JBUS clock signal utilizing a system clock signal and a CPU clock signal.
Figure 2:
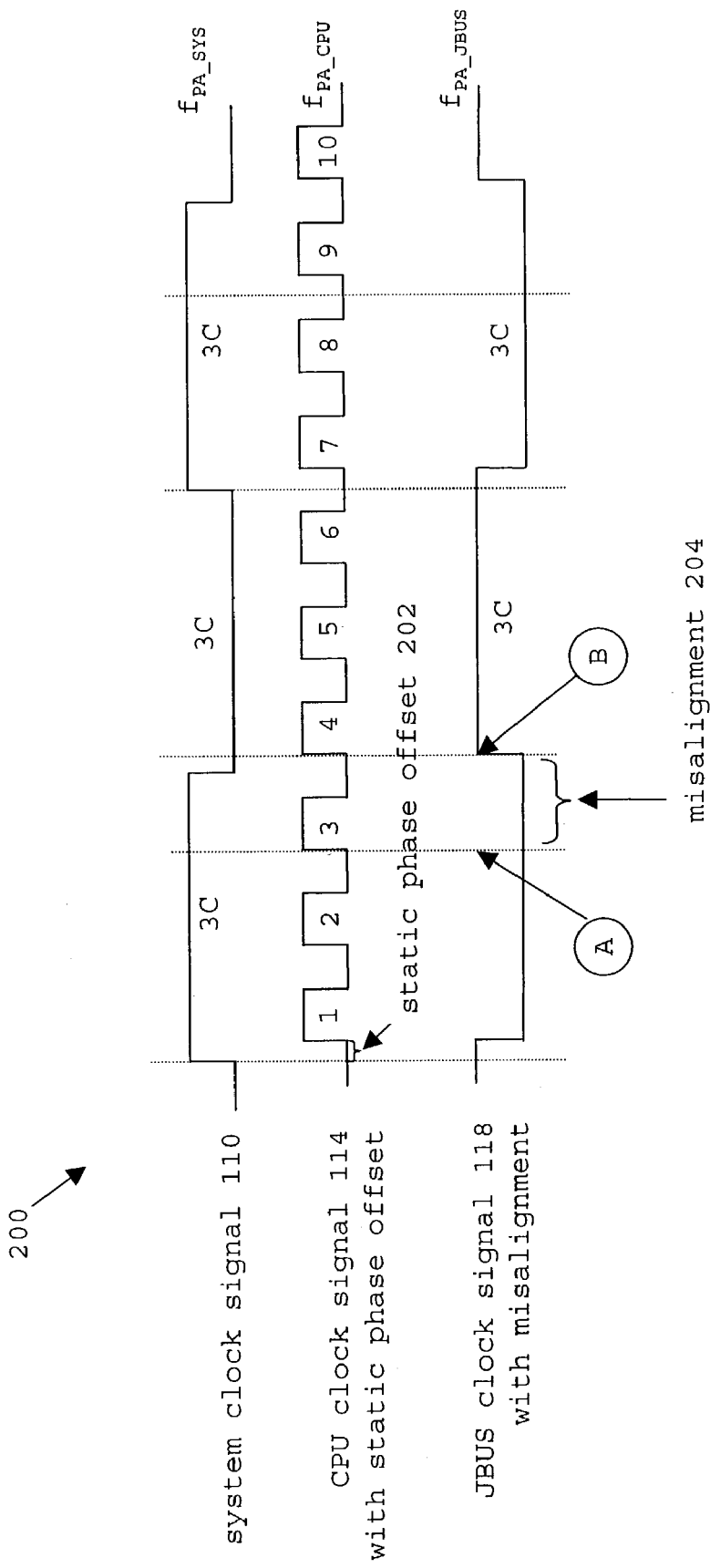
FIG. 2 illustrates an example of a timing diagram for the circuit of FIG. 1 including a system clock signal, a CPU clock signal, and a resulting JBUS clock signal.
Figure 3:
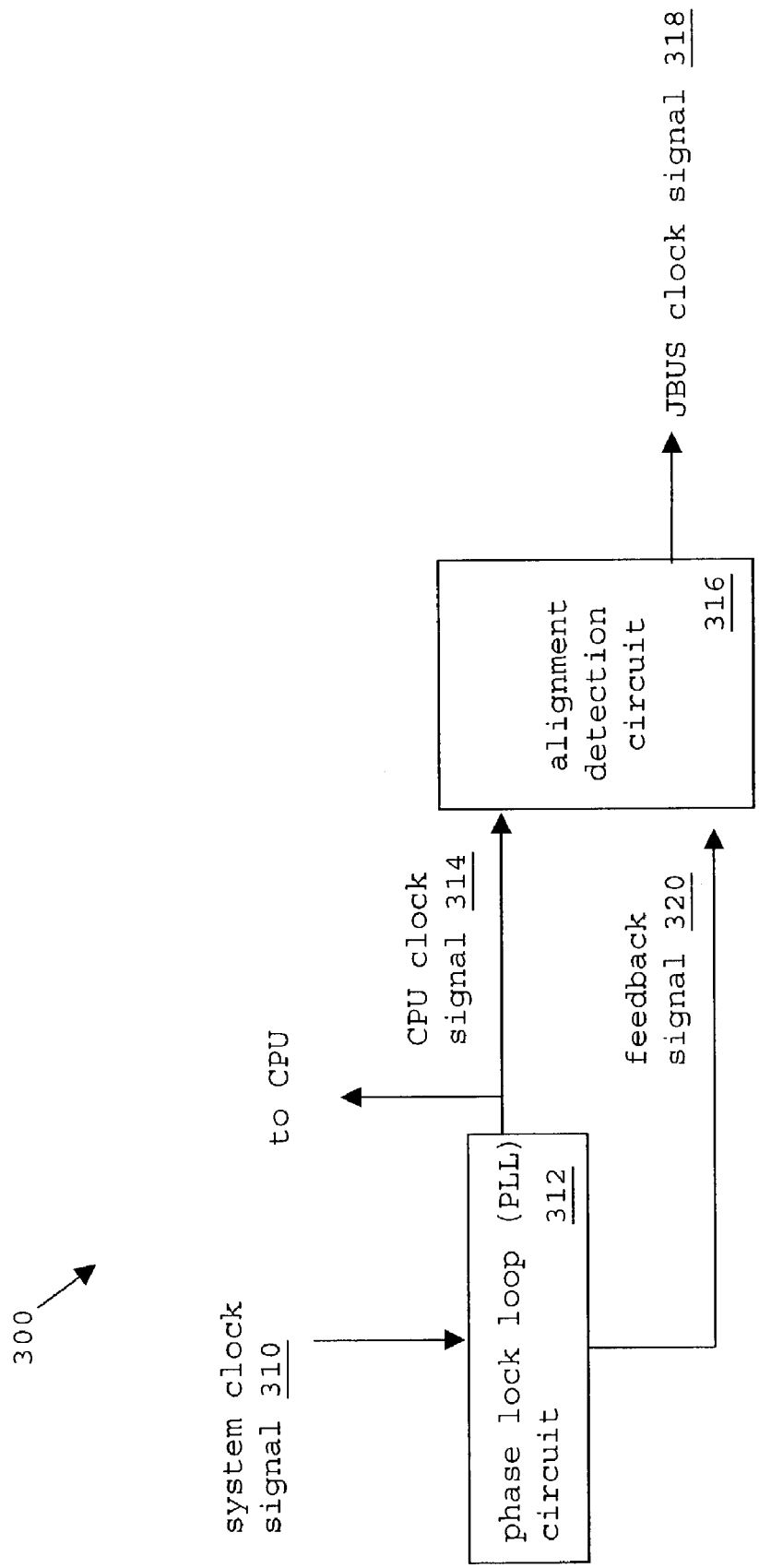
FIG. 3 illustrates a functional diagram of a static phase offset corrected clock alignment circuit for generating a JBUS clock signal utilizing a CPU clock signal and a feedback signal from a PLL circuit in accordance with one embodiment of the present invention.

FIG. 3 illustrates a functional diagram of a static phase offset corrected clock alignment circuit 300 for generating a JBUS clock signal 318 utilizing a CPU clock signal 314 and a feedback signal 320 from a PLL circuit 312 in accordance with one embodiment of the present invention. In one embodiment of the invention shown in FIG. 3, a system clock signal 310 is input to phase lock loop (PLL) circuit 312 to generate CPU clock signal 314. PLL circuit 312 utilizes feedback signal 320 to maintain synchronization of CPU clock signal 314 with system clock signal 310. PLL circuits and the use of feedback signals in PLL circuits is well known to those of skill in the art and are, therefore, not further described herein to avoid detracting from the present invention.

In one embodiment, feedback signal 320 is tapped off as an output of PLL circuit 312 and used as input together with CPU clock signal 314 to an alignment detection circuit 316 for use in generating JBUS clock signal 318. Feedback signal 320 has the same frequency as system clock signal 310 and the same leading edge as CPU clock signal 314. In this way, any static phase offset present in CPU clock signal 314 is also present in feedback signal 320. In one embodiment, CPU clock signal 314 and feedback signal 320 are input to alignment detection circuit 316 in parallel.

Alignment detection circuit 316 utilizes CPU clock signal 314 and feedback signal 320 to generate JBUS clock signal 318. Alignment detection circuits are well known to those of skill in the art and are, therefore, not further described herein to avoid detracting from the present invention.

When CPU clock signal 314 and feedback signal 320 are input to alignment detection circuit 316, there is little to no alignment disparity due to static phase offset as both CPU clock signal 314 and feedback signal 320 include any static phase offset introduced by PLL circuit 312. Consequently, in one embodiment, the leading edge of JBUS clock signal 318 is generated by alignment detection circuit 316 in synchronization with the leading edge of CPU clock signal 314 and with the same frequency as feedback signal 320 (which is the same frequency as system clock 310).

Figure 4:
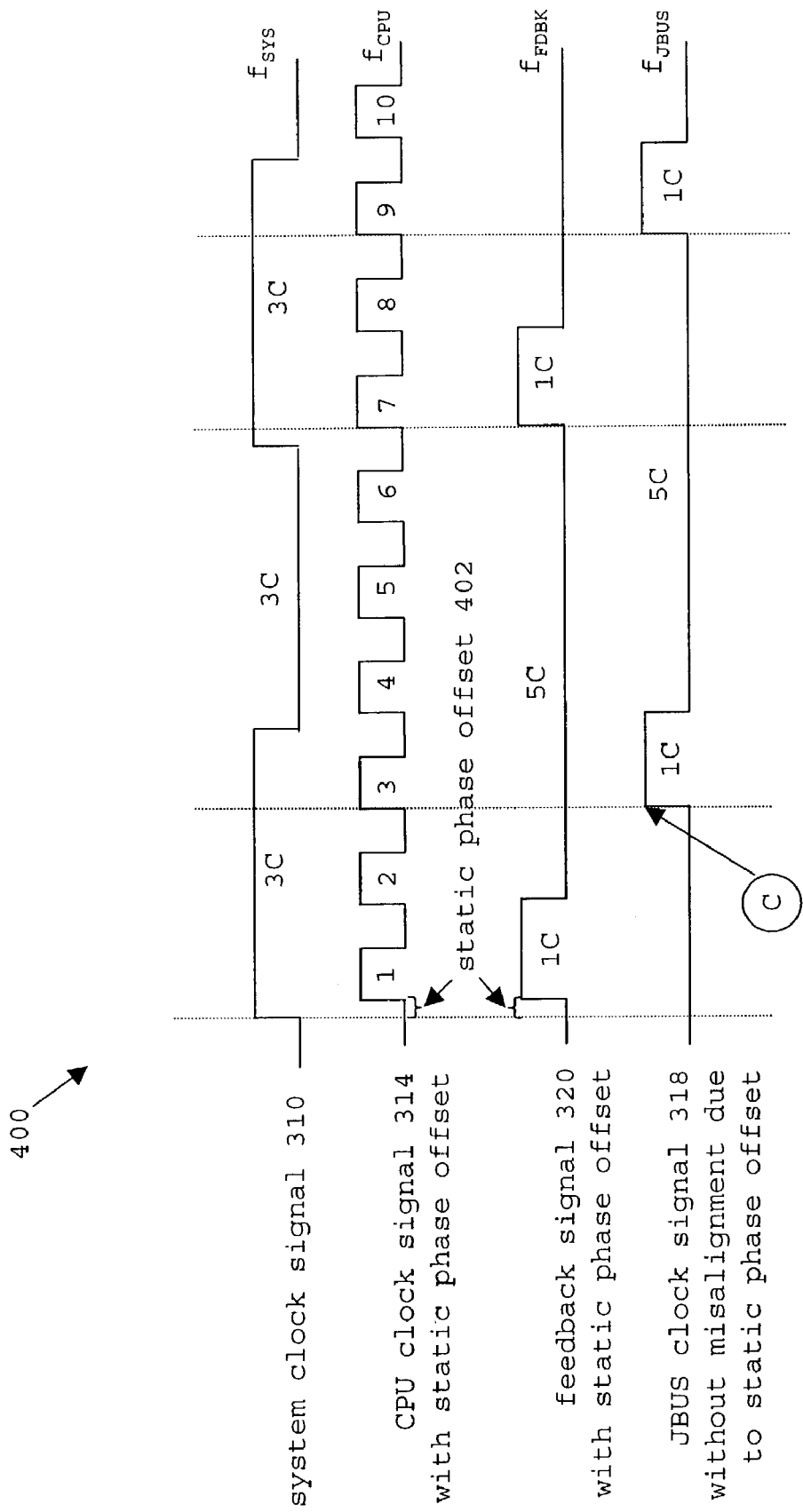
FIG. 4 illustrates an example of a timing diagram for the static phase offset corrected clock alignment circuit of FIG. 3 including a system clock signal, a CPU clock signal, a feedback signal, and a JBUS clock signal in accordance with one embodiment of the present invention.

FIG. 4 illustrates an example of a timing diagram 400 for static phase offset corrected clock alignment circuit 300 including system clock signal 310, CPU clock signal 314, feedback signal 320, and JBUS clock signal 318 in accordance with one embodiment of the present invention. Referring now to FIGS. 3 and 4 together, in one embodiment, input of system clock signal 310 to PLL circuit 312 results in generation of CPU clock signal 314 and feedback signal 320, both having the same static phase offset 402 introduced by PLL circuit 312.

As illustrated in FIG. 4, system clock signal 310 has a frequency, $f_{SYS}$. When input to PLL circuit 312, in the present embodiment, resulting CPU clock signal 314 has a frequency $f_{CPU}$ and feedback signal 320 has a frequency $f_{FDBK}$ equal to frequency $f_{SYS}$.

In one embodiment, input of CPU clock signal 314 and feedback signal 320 (both having static phase offset 402 introduced by PLL circuit 312) to alignment detection circuit 316 results in the generation of JBUS clock signal 318 in alignment with the leading edge of CPU clock signal 314 and having a frequency $f_{JBUS}$ equal to frequency $f_{SYS}$ of system clock signal 310. In one embodiment, JBUS clock signal 318 is generated having a two clock cycle delay from system clock signal 310. Thus, in the present embodiment, as illustrated in FIG. 4, the leading edge of JBUS clock signal 318 is properly synchronized with the leading edge of clock cycle three of CPU clock signal 314 and does not suffer from the misalignment seen in the prior art.

Those of skill in the art will readily recognize that the choice of a two clock cycle delay between JBUS clock signal 318 and system cock signal 310 was made arbitrarily and for illustrative purposes only. Consequently, it will be appreciated by those of skill in the art, that in other embodiments, JBUS clock signal 318 can be generated at different delays from system clock signal 310 and/or at different frequencies.

Figure 5:
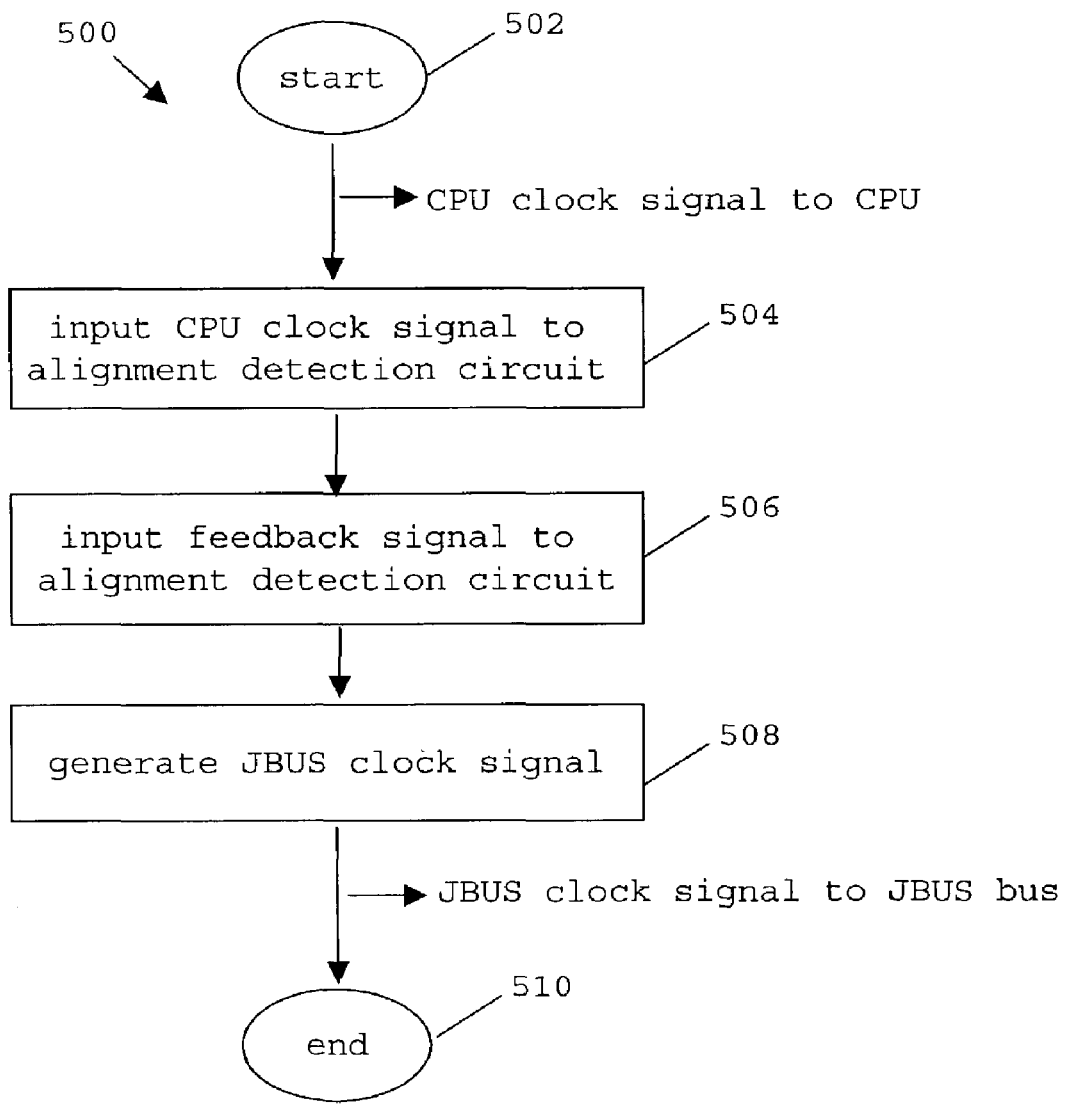
FIG. 5 illustrates a method implemented by the static phase offset corrected clock alignment circuit of FIG. 3 for generating a JBUS clock signal utilizing a CPU clock signal and a feedback signal of a PLL circuit in accordance with one embodiment of the present invention.

FIG. 5 illustrates a method 500 implemented by static phase offset corrected clock alignment circuit 300 for generating JBUS clock signal 318 utilizing CPU clock signal 314 and feedback signal 320 of PLL circuit 312 in accordance with one embodiment of the present invention. Referring now to FIGS. 3, 4 and 5, in one embodiment, method 500 is implemented utilizing static phase offset corrected clock alignment circuit 300 and is entered from a start operation 502.

In start operation 502, system clock signal 310 having frequency $f_{SYS}$ is input to PLL circuit 312 to generate CPU clock signal 314 having frequency $f_{CPU}$ and feedback signal 320 having frequency $f_{FDBK}$. Both CPU clock signal 314 and feedback signal 320 include static phase offset 402 introduced by PLL circuit 312. From start operation 502, flow moves to an input CPU clock signal to alignment detection circuit operation 504.

In input CPU clock signal to alignment detection circuit operation 504, CPU clock signal 314 having frequency $f_{CPU}$ is input to alignment detection circuit 316. From input CPU clock signal to alignment detection circuit operation 504, flow moves to an input feedback signal to alignment detection circuit operation 506.

In input feedback signal to alignment detection circuit operation 506, feedback signal 320 from PLL circuit 312 having frequency $f_{FDBK}$ is input to alignment detection circuit 316. In one embodiment, CPU clock signal 314 and feedback signal 320 are input to alignment detection circuit 316 in parallel. From input feedback signal to alignment detection circuit operation 506, flow moves to a generate JBUS clock signal operation 508.

In generate JBUS clock signal operation 508, alignment detection circuit 316 generates JBUS clock signal 318 utilizing CPU clock signal 314 and feedback signal 320, such that the leading edge of JBUS clock signal 318 is synchronized with the leading edge of CPU clock signal 314 and has the frequency $f_{JBUS}$ which equal to the frequencies $f_{FDBK}$ and $f_{SYS}$. In one embodiment, JBUS clock signal 318 is generated having a two clock cycle delay from system clock signal 310. It can, however, be appreciated by those of skill in the art, that in other embodiments, JBUS clock signal 318 can be generated at different delays from system clock signal 310 and/or at different frequencies. From generate JBUS clock signal operation 508, flow exits method 500 at end operation 510. During actual operation of a microprocessor, method 500 can be continuously performed while the microprocessor is in operation.

Figure 6:
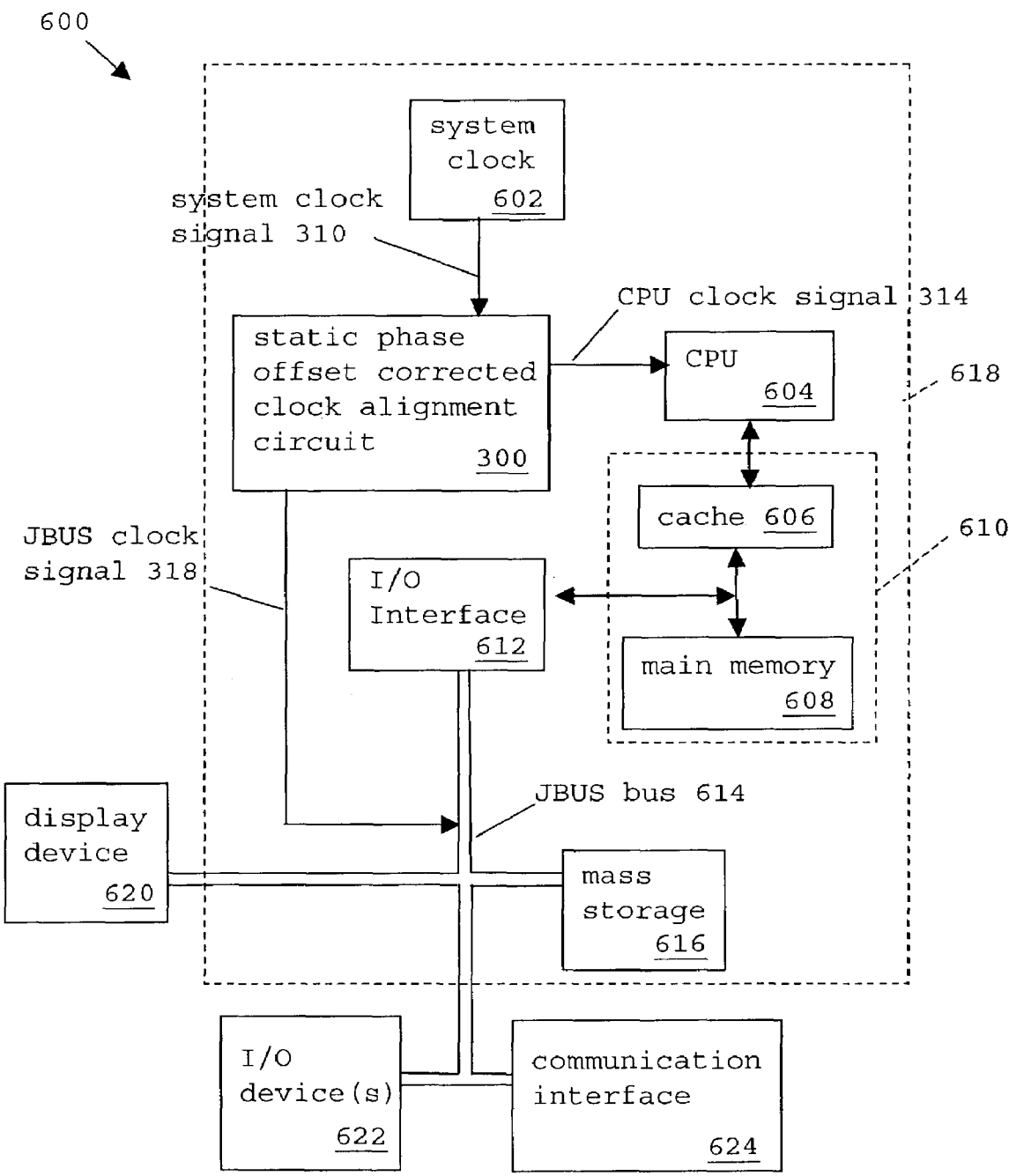
FIG. 6 illustrates a block diagram of a computer system including the static phase offset corrected clock alignment circuit of FIG. 3 in accordance with one embodiment of the present invention.

FIG. 6 illustrates a block diagram of a computer system 600 including static phase offset corrected clock alignment circuit 300 in accordance with one embodiment of the present invention. Computer system 600 in accordance with the present invention includes: a system clock 602 for providing system clock signal 310 to static phase offset corrected clock alignment circuit 300; static phase offset corrected clock alignment circuit 300 coupled to at least a CPU 604 and a JBUS bus 614 and for providing at least CPU clock signal 314 to CPU 604 and JBUS clock signal 318 to JBUS bus 614; JBUS bus 614 for communicating information; CPU 604 coupled with JBUS bus 614 through input/output (I/O) interface 612 for processing data and executing instructions; and a memory system 610 coupled with CPU 604 and further coupled with JBUS bus 614 through I/O interface 612 for storing information and instructions for CPU 604. Memory system 610 includes, for example, cache memory 606 and main memory 608. In some embodiments, cache memory 606 includes one or more levels of cache memory. In some embodiments, CPU 604, I/O interface 612, and some or all of cache memory 606 are integrated in a single integrated circuit, although the specific components and integration density are a matter of design choice selected to meet the needs of a particular application.

User I/O device(s) 622 are coupled to JBUS bus 614 and are operative to communicate information in appropriately structured form to and from the other parts of computer system 600. User I/O device(s) 622 can include a keyboard, mouse, card reader, magnetic or paper tape, magnetic disk, optical disk, waveform port, or other available devices, including another computer. Mass storage device 616 is coupled to JBUS bus 614, and can be implemented using one or more magnetic hard disk, magnetic tapes, CD ROMs, large banks of random access memory, or the like. A wide variety of random access and read only memory technologies are available and are equivalent for purposes of the present invention. Mass storage 616 can include computer programs and data stored therein. Some or all of mass storage 616 can be configured to be incorporated as a part of memory system 610.

In some embodiments, computer system 600, system clock 602, static phase offset corrected clock alignment circuit 300, CPU 604, I/O interface 612, memory system 610, and mass storage device 616, can be coupled to JBUS bus 614 formed on a printed circuit board and integrated into a single housing as suggested by the dashed-line box 618. However, the particular components chosen to be integrated into a single housing is based upon market and design choices. Accordingly, it is expressly understood that fewer or more devices can be incorporated within the housing suggested by dashed line 618.

Display device 620 is used to display messages, data, a graphical or command line user interface, or other communications, with the user. Display device 620 can be implemented, for example, by a cathode ray tube (CRT) monitor, liquid crystal display (LCD), or any available equivalent.

As described above, and unlike the prior art, in accordance with the invention, a JBUS clock signal is generated utilizing a CPU clock signal and a feedback signal of a phase lock loop (PLL) circuit used in generating the CPU clock signal from a system clock signal. The present invention reduces or eliminates the effect of static phase offset in the resultant JBUS clock signal and achieves an acceptable timing margin for both setup and hold time.

The foregoing description of implementations of the invention have been presented for purposes of illustration and description only, and, therefore, are not exhaustive and do not limit the invention to the precise forms disclosed. For example, although static phase offset corrected clock alignment circuit 300 is described herein with reference to generation of JBUS clock signal 318, clock signals used for other address/data protocols can also be generated using the present invention. Further, although static phase offset corrected clock alignment circuit 300 is described herein with reference to generation of JBUS clock signal 318, other signals can additionally be generated through static phase offset corrected clock alignment circuit 300 using additional inputs and circuitry, such as, for example, a memory clock signal. Further herein, a means for performing a particular function is accomplished using the appropriate hardware and the related computer signals necessary to performing the function.

Modifications and variations are possible in light of the above teachings or can be acquired from practicing the invention. Consequently, Applicants do not wish to be limited to the specific embodiments shown for illustrative purposes.

What is claimed is:

1. A method for generating a JBUS clock signal, the method comprising:
   inputting a central processor (CPU) clock signal to an alignment detection circuit, the CPU clock signal being generated from a phase lock loop (PLL) circuit utilizing a system clock signal having a frequency $f_{SYS}$, the CPU clock signal having a leading edge at a selected clock cycle and a frequency $f_{CPU}$, wherein the CPU clock signal has a static phase offset introduced by the PLL circuit;
   inputting a feedback signal from the PLL circuit to the alignment detection circuit, the feedback signal having a frequency $f_{FDBK}$ that is equal to the frequency $F_{SYS}$, wherein the feedback signal has the same static phase offset introduced by the PLL circuit as the CPU clock signal; and
   generating a JBUS clock signal by the alignment detection circuit, a leading edge of the JBUS clock signal being synchronized with the leading edge of the CPU clock signal and having a frequency $f_{JBUS}$ that is equal to the frequency $f_{FDBK}$.

2. The method of claim 1, wherein the CPU clock signal and the feedback signal are input to the alignment detection circuit in parallel.

3. A method for generating a JBUS clock signal, the method comprising:
   inputting a system clock signal to a phase lock loop (PLL) circuit, the system clock signal having a frequency $f_{SYS}$;
   generating a CPU clock signal by the PLL circuit utilizing the system clock signal, wherein the CPU clock signal has a static phase offset introduced by the PLL circuit;
   generating a feedback signal by the PLL circuit, wherein the feedback signal has the same static phase offset introduced by the PLL circuit as the CPU clock signal;
   inputting the CPU clock signal generated by the PLL circuit to an alignment detection circuit, the CPU clock signal having a leading edge at a specified clock cycle and a frequency $f_{CPU}$;
   inputting the feedback signal generated by the PLL circuit to the alignment detection circuit, the feedback signal having a frequency $f_{FDBK}$ equal to the frequency $f_{SYS}$; and
   generating a JBUS clock signal by the alignment detection circuit, a leading edge of the JBUS clock signal being synchronized with the leading edge of the CPU clock signal and having a frequency $f_{JBUS}$ that is equal to the frequency $f_{FDBK}$.

4. The method of claim 3, wherein the CPU clock signal and the feedback signal are input to the alignment detection circuit in parallel.

5. A static phase offset corrected clock alignment circuit for generating a JBUS clock signal, the static phase offset corrected clock alignment circuit comprising:
   a phase lock loop (PLL) circuit for receiving a system clock signal and for generating a CPU clock signal and a feedback signal, wherein the PLL circuit generates the CPU clock signal and the feedback signal with the same amount of static phase offset; and
   an alignment detection circuit coupled to the PLL circuit, the alignment detection circuit for receiving input of the CPU clock signal and the feedback signal from the PLL circuit, and for generating a JBUS clock signal.

6. The static phase offset corrected clock alignment circuit of claim 5, wherein the CPU clock signal and the feedback signal are input to the alignment detection circuit in parallel.

7. The static phase offset corrected clock alignment circuit of claim 5, wherein the system clock signal has a frequency $f_{SYS}$, and wherein the CPU clock signal is input to the alignment detection circuit with a leading edge at a specified clock cycle and a frequency $f_{CPU}$, and wherein the feedback signal is input to the alignment detection circuit with a frequency $f_{FDBK}$ that is equal to the frequency $f_{SYS}$;

and further wherein the JBUS clock signal is generated by the alignment detection circuit with a leading edge synchronized with the leading edge of the CPU clock signal and a frequency $f_{JBUS}$ that is equal to the frequency $f_{FDBK}$.

8. A static phase offset corrected clock alignment circuit for generating a JBUS clock signal, the static phase offset corrected clock alignment circuit comprising:

a phase lock loop (PLL) circuit comprising one or more circuit elements for generating a CPU clock signal and a feedback signal, wherein the PLL circuit generates the CPU clock signal and the feedback signal with the same amount of static phase offset, the PLL circuit further comprising:

an input for receiving a system clock signal, a first output for outputting the CPU clock signal, and a second output for outputting the feedback signal; and an alignment detection circuit coupled to the PLL circuit, the alignment detection circuit comprising one or more circuit elements for generating a JBUS clock signal, the alignment detection circuit further comprising:

a first input coupled to the first output of the PLL circuit, the first input for receiving the CPU clock signal, a second input coupled to the second output of the PLL circuit, the second input for receiving the feedback signal, and an output for outputting the JBUS clock signal.

9. The static phase offset corrected clock alignment circuit of claim 8, wherein the JBUS clock signal is generated by the alignment detection circuit with a leading edge synchronized with the CPU clock signal.

10. The static phase offset corrected clock alignment circuit of claim 8, wherein the first output of the PLL circuit is further coupled to a central processor unit (CPU), and further wherein the output of the alignment detection circuit is coupled to a JBUS bus.

11. A computer system comprising:

a system clock for generating a system clock signal;

a static phase offset corrected clock alignment circuit coupled to the system clock, the static phase offset corrected clock alignment circuit for receiving the system clock signal, the static phase offset corrected clock alignment circuit comprising:

a phase lock loop (PLL) circuit coupled to the system clock, the PLL circuit for receiving the system clock signal and for generating a CPU clock signal and a feedback signal, wherein the PLL circuit generates the CPU clock signal and the feedback signal with the same amount of static phase offset, and an alignment detection circuit coupled to the PLL circuit for receiving input of the CPU clock signal and the feedback signal from the PLL circuit, and for generating a JBUS clock signal;

a central processor unit (CPU) coupled to the static phase offset corrected clock alignment circuit, the CPU for receiving input of the CPU clock signal from the static phase offset corrected clock alignment circuit; and a JBUS bus coupled to the static phase offset corrected clock alignment circuit, the JBUS bus for receiving input of the JBUS clock signal from the static phase offset corrected clock alignment circuit.

12. The computer system of claim 11, wherein the CPU clock signal and the feedback signal are input to the alignment detection circuit in parallel.

13. The computer system of claim 11, wherein the system clock signal has a frequency $f_{SYS}$, and wherein the CPU clock signal is input to the alignment detection circuit with a leading edge at a specified clock cycle and a frequency $f_{CPU}$, and wherein the feedback signal is input to the by the alignment detection circuit with a frequency $f_{FDBK}$, that is equal to the frequency $f_{SYS}$;

and further wherein the JBUS clock signal is generated by the alignment detection circuit with a leading edge synchronized with the leading edge of the CPU clock signal and a frequency $f_{JBUS}$ that is equal to the frequency $f_{FDBK}$.

14. A static phase offset corrected clock alignment circuit for generating a JBUS clock signal, the static phase offset corrected clock alignment circuit comprising:

means for receiving a system clock signal and for generating a CPU clock signal and a feedback signal, the CPU clock signal and the feedback signal having the same amount of static phase offset; and a means for receiving the CPU clock signal and the feedback signal and for generating a JBUS clock signal, wherein the system clock signal has a frequency $f_{SYS}$, and wherein the CPU clock signal has a frequency $f_{CPU}$, and wherein the feedback signal has a frequency $f_{FDBK}$, that is equal to the frequency $f_{SYS}$;

and further wherein the JBUS clock signal is synchronized with the CPU clock signal and has a frequency $f_{JBUS}$ that is equal to the frequency $f_{FDBK}$.

* * * * *

UNITED STATES PATENT AND TRADEMARK OFFICE
CERTIFICATE OF CORRECTION

PATENT NO. : 7,111,186 B2 Page 1 of 1
APPLICATION NO. : 10/425213
DATED : September 19, 2006
INVENTOR(S) : Han et al.

It is certified that error appears in the above-identified patent and that said Letters Patent is hereby corrected as shown below:

Column 10
In Claim 13, at line 23, after "to be", delete "by the".

Signed and Sealed this

Fifth Day of December, 2006

JON W. DUDAS
*Director of the United States Patent and Trademark Office*